Aug. 30, 1966   J. H. BAILY ETAL   3,269,919
AUTOMATIC STILL
Filed June 11, 1963                                    2 Sheets-Sheet 1
FIG_1
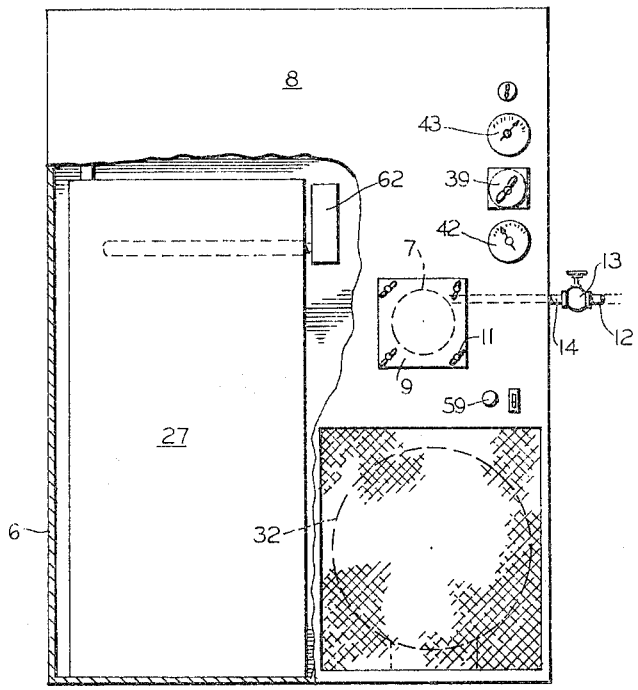
FIG_2
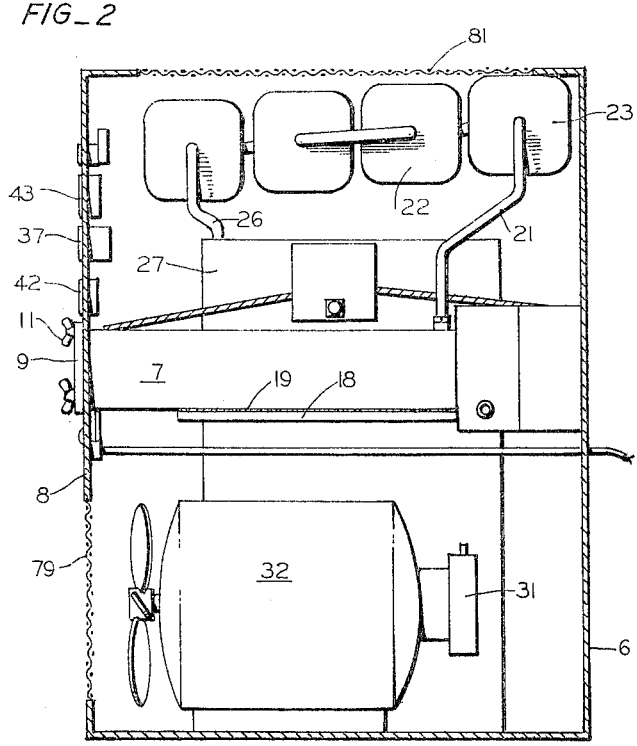
INVENTORS
JACK H. BAILY
ELI STERLING
BY *Lothrop & West*
ATTORNEYS

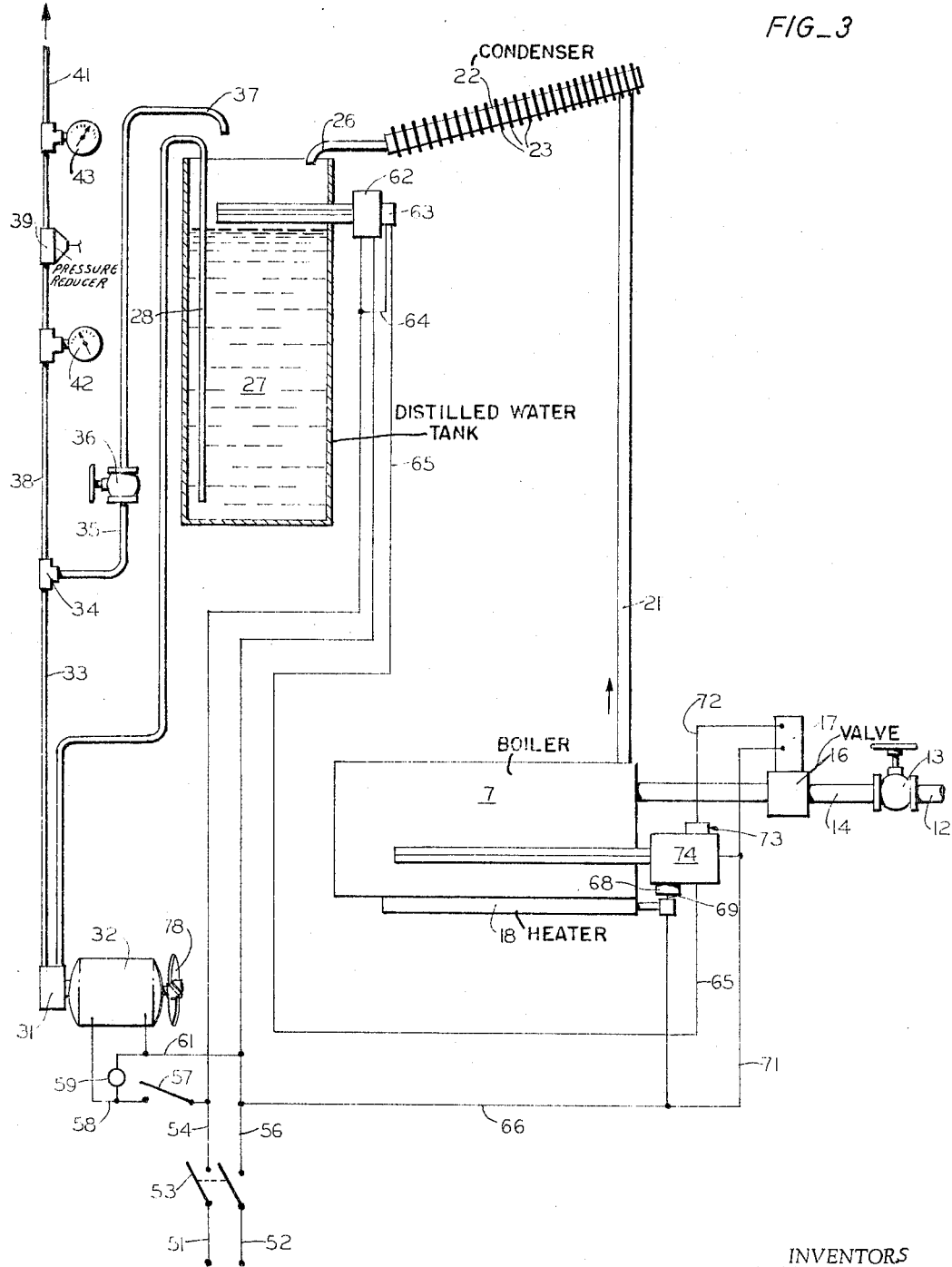

United States Patent Office 3,269,919
Patented August 30, 1966

3,269,919
AUTOMATIC STILL
Jack H. Baily, North Hollywood, and Eli Sterling, Van Nuys, Calif., assignors to Steam Sales & Service Co., a corporation of California
Filed June 11, 1963, Ser. No. 287,100
4 Claims. (Cl. 202—160)

Our invention relates to means primarily designed to supply distilled water upon demand and continuously for use in various different fields. As one example, distilled water is now often supplied in limited quantities, usually in bottles, for use in pressing plants and the like in which the steam irons require to be maintained free of scale and comparable deposits that are left behind if raw water is used. In the printing industry, there is a similar need for comparable quantities of distilled water.

It is therefore an object of our invention to provide an automatic still which will afford on the premises a supply of distilled water generated from the raw water normally available Another object of the invention is to provide an automatic still of the mentioned sort which can be left to itself and merely requires supervision for starting and stopping and occasional cleaning.

A further object of the invention is to provide an automatic still for use on even highly contaminated raw water, the distillation part of the apparatus being such that it can quite readily and easily be cleaned.

Another object of the invention is to provide an automatic still which is simple, compact and economical.

A still further object of the invention is to provide an automatic still which can be operated on the electrical current and raw water supply normally available in most locations.

Other objects together with the foregoing are attained in the embodiment of the invention described in the accompanying description and illustrated in the accompanying drawings, in which:

FIGURE 1 is a front elevation of an automatic still constructed pursuant to our invention, a portion being broken away to disclose the interior arrangement;

FIGURE 2 is a cross section through an automatic still constructed in accordance with the invention; and FIGURE 3 is a diagram both electrical and mechanical showing the general layout and connections of our automatic still.

While the subject still can be embodied in a large number of different ways, it has successfully been commercially embodied substantially as shown herein primarily for use in connection with a pressing plant having a requirement for distilled water to supply a plurality of steam irons.

As incorporated for this particular use, the device includes a main frame 6 which serves also as a housing and incorporates the customary frame members, covers and the like. Disposed on the frame 6 in a convenient location is a boiler 7. This is preferably a circular cylindrical metal tube entirely smooth on its inside and horizontally mounted so that one end is available at the front panel 8 of the frame 6. A removable, gasketed cover plate 9 is secured to the tube by wing nuts 11 so that when closed the boiler 7 is tight and is susceptible to operation at superatmospheric pressure. When the wing nuts 11 and the plate 9 have been removed, the interior of the boiler is readily accessible for full inspection and ready cleaning.

Whatever raw water is available in the customary supply pipe 12 is led through a hand valve 13 into a duct 14 extending to the interior of the frame for connection to the boiler 7. This connection is not immediate, but is rather through a valve 16 controlled by an electrically energized solenoid 17 so that flow through the conduit 14 to the boiler 7 can be electrically controlled.

In order to furnish thermal energy to cause evaporation of water within the boiler, one or more electric heating elements 18 are associated with the boiler 7. While these elements can in some instances be internally disposed, they are preferably externally mounted so as to leave the interior of the boiler free for cleaning. Good thermal transmission from the heater to the boiler 7 is attained through a body of silver solder 19 or comparable thermal conducting material intimately uniting the heater with the material of the boiler 7.

When the heater 18 is operating, raw water within the boiler 7 is changed to vapor and travels upwardly from the boiler through a conduit 21 into a condenser 22. The condenser is disposed at the upper end of the frame 6 and conveniently is of the series tube type, the tube having a plurality of radiating fins 23 thereon. The tube is arranged in all portions in a continually declining attitude from the high point at which the conduit 21 enters. As the vapor loses its heat in the condenser and changes to water, it flows by gravity downwardly toward an outlet conduit 26 discharging into a distilled water tank 27 supported on the frame 6.

Distilled water is taken from the tank 27 through an inlet pipe 28 extending substantially to the bottom of the tank 27 and looped over the upper open end thereof to connect to a water pump 31. An electric motor 32 mounted on the frame 6 drives the water pump 31 and is effective to take in water from the conduit 28 and to discharge it under pressure through an outlet pipe 33. A T 34 in the pipe 33 has one branch 35 leading through a manually operated valve 36 to a return line 37 discharging into the tank 27, so that when the motor 32 operates, there can be a local circulation of the distilled water from the tank 27 and back to the tank 27, at least partially under control of the manual valve 36.

From the T 34 a branch conduit 38 leads to a pressure reducer 39 and to a discharge pipe 41. A pressure gauge 42 indicates the pressure in advance of the regulator 39 and a similar pressure gauge 43 indicates the pressure after the regulator 39. Depending upon the position of the valve 36 and the operation of the motor 32, distilled water under pressure is made available in the outlet 41.

It is preferred that the automatic still operate on electricity available at the usual mains or conductors 51 and 52. This is usually about one-hundred-fifteen volts alternating current. A master switch 53 is disposed in the conductors 51 and 52 so that the entire unit can be disconnected from the electrical supply if desired. The electrical motor 32 is connected directly across a pair of conductors 54 and 56 continuing the conductors 51 and 52, and is under the control of a manual switch 57 included in a branch line 58 from the conductor 54. A pilot light 59 shunts the motor 32 between the branch line 58 and a branch line 61 extending to the conductor 56.

Thus the motor and pump section of the device can be manually turned off and on at any time at the discretion of the user. This is normally accomplished in accordance with the demand for distilled water in the line 41.

The conductors 54 and 56 extend to a water level responsive device 62 installed in the distilled water tank 27. While any sort of level responsive mechanism such as a float can be employed, it is preferred in the present instance to utilize a device which responds to water level by means of thermal action. The conductors 54 and 56 supply a heater effective upon a thermostat within the device 62 for controlling a switch 63. When the heater is operating during low water, its energy is dissipated primarily to the air and the temperature of the heater and of the thermostat is relatively high, keeping the switch 63 closed. When, however, the water level in the tank 27 is high, the loss of heat from the heater is great, the thermostat is cool, and so the switch 63 is open. Thus the electrical circuit through the switch 63 and including the conductors 64 and 65 is controlled by the water level in the tank 27.

The water level responsive device 62 governs the operation of the heater 18 and also of the solenoid 17 for the water valve 16. For this reason, a branch line 66 extends from the conductor 56 to the heater 18. The conductor 65 extends to a switch 68 connected by a conductor 69 to the heater 18. An extension 71 carries the conductor 66 to the solenoid 17 while a conductor 72 connects the solenoid to a switch 73 in the conductor 65. The switches 68 and 73 are operated by a device 74 similar to the device 62, having an internal heater connected to the lines 65 and 71.

When the water level is relatively low in the boiler 7, the device 74 is at a relatively high temperature and the thermally responsive element therein closes the switch 73 to energize the solenoid 17 and to open the valve 16. There is a resulting influx of raw water to the boiler. The rising water comes into thermal relationship with the device 74, reduces its temperature, opens the switch 73 so that the solenoid 17 is de-energized and closes the valve 16 to stop the inflow of water. In this fashion, the water level in the boiler 7 is made to control the supply of raw water from the conduit 12. An average water level is thus maintained in the boiler 7. In addition, the thermostat controls the switch 68 governing the operation of the heater 18. This switch is normally closed, so that whenever the switch 63 is closed, the heater 18 is energized. This is normally a continuous energization throughout the operation of the machine until the supply of distilled water gets sufficiently high. Then the heater 18 is stopped by the switch 63 and when the level of distilled water falls the switch 63 again energizes the heater 18.

Under some circumstances, the supply of raw water to the boiler 7 might fail. In that case, the temperature of the boiler 7 might become excessive. Under those circumstances, the device 74 goes beyond its normal travel and opens the switch 68 to interrupt the supply of electricity to the heater 18. Excessive temperature shuts the heater 18 off and the heater remains off until the temperature lowers to an appropriate value.

In the operation of the structure, therefore, when the master switch 53 is closed and the motor switch 57 is likewise closed, the solenoid valve is opened, there is a flow of raw water to the boiler 7, and the water is heated in the boiler since the heater 18 is energized. The resulting vapor rises to the condenser 22, condenses and is fed to the tank 27. When there is sufficient condensate, the water level rises, the heater is shut off, as is the water valve 17. When the distilled water level again drops, the heater is re-energized and the valve 16 is appropriately opened.

After the closure of the switch 57, the motor 32 is opertaed to maintain adequate pressure within the discharge line 41, the distillate being taken from the tank 27 and surplus returned thereto, depending upon the condition of the hand valve 36.

While it is sometimes not needed, it is often helpful to permit the motor 32 to serve as a means for assisting in the thermal circulation of air over the condenser 22. For that reason, the motor 32 carries a circulating fan 78 disposed near a screened air inlet 79 on the front face or panel 8 of the frame 6. The air is blown over the mechanism and particularly over the condenser fins 23 for discharge through a screened outlet 81 in the top of the frame 6. Since the motor 32 is usually in continuous operation, there is provided a continuous circulation of cooling air from an advantageous low point on the frame over the condenser and for discharge at a high point on the frame. Even if the motor is not operating the fan or even if a fan is not provided, there is nevertheless a thermal circulation of air from the low inlet 79 over the condenser and out the upper outlet 81.

What is claimed is:

1. An automatic still for producing distilled water from raw water which comprises a frame, a boiler on said frame, an electric heater in thermal conducting relationship with said boiler for heating the same, means comprising an inlet conduit connected to said boiler for conducting raw water to said boiler from a raw water source, an electrically actuated valve in said inlet conduit for regulating the flow of raw water to the boiler, means comprising an electric switch for controlling the operation of said valve in the inlet conduit, said electric switch comprising a thermostat which is operable responsive to the level of water in said boiler for actuating said switch which operates said valve, a vertically inclined tube condenser disposed at the upper end of said frame, said tube condenser comprising a plurality of radiating fins and having an inlet at its upper end and an outlet at its lower and opposite end, conduit means connecting said boiler to the inlet of said condenser for conducting vapor from the boiler into the condenser where said vapor is condensed to distilled water and flows by gravity downwardly of the inclined condenser tube to the outlet thereof, a distilled water tank on said frame and disposed adjacent the outlet of said condenser for receiving and storing distilled water, means comprising a thermostat-controlled electric switch which is electrically connected to said heater, said thermostat-controlled switch being actuated responsive to the level of distilled water in said tank, said electric heater being de-energized by said thermostat-controlled electric switch when the level of distilled water in said tank reaches a sufficiently high level, said thermostat-controlled switch being energized to actuate said heater when the level of the distilled water in said tank falls to a low level, a distilled water outlet conduit in communication with said tank and extending substantially to the bottom thereof, a pump connected to said water outlet conduit, a discharge pipe for conveying distilled water and which is connected to said pump, an electric motor driving said pump for withdrawing distilled water from said tank and discharging the same under pressure through said discharge pipe to a point of use, a fan driven by said motor for circulating air over said condenser radiating fins to cool the same, said distilled water discharge pipe comprising a T with a branch line leading back to said tank for returning distilled water to the tank, valve means in said branch line, a pressure reducer in said distilled water discharge pipe for regulating the water pressure therein, and pressure gauge means in said discharge pipe in advance of said pressure reducer and a second pressure gauge in said discharge pipe located beyond said pressure reducer.

2. An automatic still comprising a substantially enclosed frame having an air inlet thereto and an air outlet therefrom, a boiler on said frame, means for supplying said boiler with raw water under pressure, a condenser within said frame above said boiler and adjacent said air outlet, means for conducting vapor from said boiler to said condenser, a water tank on said frame, means for draining distilled water from said condenser into said water tank, an electric heater in thermal conducting relationship with said boiler, means responsive to the level of water in said water tank for regulating the operation of said heater, a discharge pipe on said frame, a pump having an inlet and an outlet, means for connecting the outlet of said pump to said discharge pipe, means for connecting the inlet of said pump to said water tank, a fan for circulating air from said air inlet through said enclosed frame and over said condenser to discharge from said air outlet, and a single electric motor on said frame and connected to drive said pump and said fan.

3. An automatic still as in claim 2 in which there is a return line connected to said discharge line and opening into said water tank.

4. An automatic still as in claim 3 in which a valve is provided in said return line.

References Cited by the Examiner
UNITED STATES PATENTS

| | | | |
|---|---|---|---|
| 41,819 | 3/1864 | Prentiss et al. | 202—163 |
| 1,361,834 | 12/1920 | De Baufre | 202—163 |
| 2,441,361 | 5/1948 | Kirgan | 202—160 X |
| 2,994,643 | 8/1961 | Smalling | 202—160 X |
| 3,055,810 | 9/1962 | Skow | 202—206 X |

NORMAN YUDKOFF, *Primary Examiner.*

F. E. DRUMMOND, *Assistant Examiner.*